(12) United States Patent
Wolczko et al.

(10) Patent No.: US 8,826,241 B2
(45) Date of Patent: Sep. 2, 2014

(54) INSTRUCTION SAMPLING IN A MULTI-THREADED PROCESSOR

(75) Inventors: Mario I. Wolczko, San Carlos, CA (US); Adam R. Talcott, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2126 days.

(21) Appl. No.: 10/780,264

(22) Filed: Feb. 16, 2004

(65) Prior Publication Data

US 2005/0183063 A1 Aug. 18, 2005

(51) Int. Cl.
*G06F 9/44* (2006.01)
*G06F 9/45* (2006.01)

(52) U.S. Cl.
USPC ............ 717/128; 717/127; 717/131; 717/151

(58) Field of Classification Search
CPC .. G06F 8/443; G06F 11/3466; G06F 11/3636
See application file for complete search history.

(56) References Cited

U.S. PATENT DOCUMENTS

| | | | |
|---|---|---|---|
| 5,809,450 A | 9/1998 | Chrysos et al. | |
| 5,881,223 A | 3/1999 | Agrawal et al. | 395/184.01 |
| 6,000,044 A * | 12/1999 | Chrysos et al. | 714/47 |
| 6,026,236 A * | 2/2000 | Fortin et al. | 717/127 |
| 6,052,708 A | 4/2000 | Flynn et al. | |
| 6,092,180 A | 7/2000 | Anderson et al. | |
| 6,148,396 A | 11/2000 | Chrysos et al. | |
| 6,195,748 B1 | 2/2001 | Chrysos et al. | |
| 6,253,338 B1 | 6/2001 | Smolders | |
| 6,356,615 B1 | 3/2002 | Coon et al. | |
| 6,360,337 B1 | 3/2002 | Zak et al. | 714/47 |
| 6,415,378 B1 | 7/2002 | Davidson et al. | |
| 6,446,029 B1 | 9/2002 | Davidson et al. | |
| 6,539,502 B1 * | 3/2003 | Davidson et al. | 714/47 |
| 6,549,930 B1 | 4/2003 | Chrysos et al. | |
| 6,557,147 B1 | 4/2003 | Lee et al. | 716/4 |
| 6,574,727 B1 * | 6/2003 | Davidson et al. | 712/227 |
| 6,658,654 B1 | 12/2003 | Berry et al. | |
| 6,662,358 B1 * | 12/2003 | Berry et al. | 717/128 |
| 6,772,322 B1 | 8/2004 | Merchant et al. | |
| 7,051,189 B2 | 5/2006 | Warnes | |
| 7,058,928 B2 * | 6/2006 | Wygodny et al. | 717/128 |
| 7,096,390 B2 * | 8/2006 | Talcott et al. | 714/45 |
| 7,114,150 B2 * | 9/2006 | Dimpsey et al. | 717/131 |
| 7,398,518 B2 * | 7/2008 | Dichter | 717/127 |
| 7,448,025 B2 * | 11/2008 | Kalafatis et al. | 717/128 |
| 7,519,959 B1 * | 4/2009 | Dmitriev | 717/128 |
| 7,707,556 B1 * | 4/2010 | Bonebakker et al. | 717/128 |
| 7,739,675 B2 * | 6/2010 | Klein | 717/151 |

(Continued)

OTHER PUBLICATIONS

Namkung et al., Phase guided sampling for efficient parallel application simulation, Oct. 2006, 6 pages.*

(Continued)

*Primary Examiner* — Thuy Dao
(74) *Attorney, Agent, or Firm* — Polsinelli PC

(57) ABSTRACT

A method of sampling instructions executing in a multi-threaded processor which includes selecting an instruction for sampling, storing information relating to the instruction, determining whether the instruction includes an event of interest, and reporting the instruction if the instruction includes an event of interest on a per-thread basis. The event of interest includes information relating to a thread to which the instruction is bound.

22 Claims, 3 Drawing Sheets

(56) References Cited

U.S. PATENT DOCUMENTS

| | | | |
|---|---|---|---|
| 8,065,665 B1* | 11/2011 | Kosche et al. | 717/127 |
| 2002/0124237 A1 | 9/2002 | Sprunt et al. | |
| 2004/0111708 A1* | 6/2004 | Calder et al. | 717/131 |
| 2004/0163077 A1* | 8/2004 | Dimpsey et al. | 717/130 |
| 2005/0010908 A1 | 1/2005 | Funk et al. | |
| 2005/0132336 A1* | 6/2005 | Gotwals et al. | 717/127 |
| 2006/0235648 A1 | 10/2006 | Zheltov et al. | |
| 2007/0061793 A1* | 3/2007 | Inglis et al. | 717/151 |
| 2007/0089094 A1* | 4/2007 | Levine et al. | 717/128 |

OTHER PUBLICATIONS

Author Unknown, "IA-32 Intel Architecture Software Developer's Manual, vol. 3: System Programming Guide", Intel Corporation, 1997.

Dean et al., ProfileMe: Hardware Support for Instruction-Level Profiling on Out-of-Order Processors, IEEE, Proceedings of Micro-30, Research Triangle Park, North Carolina, Dec. 1-3, 1997.

Dean et al., Transparent, Low-Overhead Profiling on Modern Processors, http://www.research.digital.com/SRC/dcpi/.

* cited by examiner

US 8,826,241 B2

INSTRUCTION SAMPLING IN A MULTI-THREADED PROCESSOR

BACKGROUND OF THE INVENTION

1. Field of the Invention

The present invention relates to processors, and more particularly to sampling mechanisms of processors.

2. Description of the Related Art

One method of understanding the behavior of a program executing on a processor is for a processor to randomly sample instructions as the instructions flow through the instruction pipeline. For each sample, the processor gathers information about the execution history and provides this information to a software performance monitoring tool. Unlike tools which aggregate information over many instructions (e.g., performance counters), such an instruction sampling mechanism allows the performance analyst to map processor behaviors back to a specific instruction.

In a multi-threaded processor, the processor's architectural state is replicated for each thread. For example, each thread has its own copy of the general purpose registers. This leads to much replication of state, at commensurate implementation cost.

SUMMARY OF THE INVENTION

In accordance with the invention, particular properties of instruction sampling are used to reduce the implementation cost of sampling in a multi-threaded processor by avoiding unnecessary replication. More specifically, the present invention allows software using a sampling mechanism to specify which samples (such as which threads) are of interest and to allow the sampling mechanism to discard or ignore uninteresting samples. Such a method accomplishes sampling in a multithreaded processor without replicating sampling hardware for each thread of the processor.

One aspect of a sampling mechanism in accordance with the present invention is that the data provided by the sampling mechanism represents a statistically valid set of samples, but are not, by definition, a complete representation of all instructions executed. The sampling mechanism described in this invention exploits this feature to avoid the cost and complexity of replicating the sampling mechanism for each thread (namely, the tagging, recording and reporting facilities); instead the sampling mechanism provides a single mechanism which is shared by all threads, and multiplexed between them. The sampling mechanism samples instructions without initial regard to the thread. When an instruction is tagged, the thread of that instruction is noted. When the instruction sample is complete, the sample is matched against per-thread filtering criteria; the matching is the only part of the mechanism which is replicated for each thread.

This approach for sampling within a multi threaded processor provides a cheaper and simpler implementation of sampling. An additional advantage is that the distribution of samples matches the distribution of fetch slots used by each thread. A sampling mechanism which is replicated for each thread would not have this distribution.

In another embodiment, multithreaded sampling may be implemented with even less hardware replication by providing a single set of hardware filtering criteria, and having the operating system schedule the sampling mechanism among threads. This implementation saves hardware cost, but precludes fairness among threads. This implementation might be more desirable for a processor which includes a relatively larger number of threads (e.g., a processor which supports eight threads per processor core).

The sampling mechanism can be enabled independently for each thread. Each thread has its own candidate counter and sample selection criteria registers. However, there is a single set of sample instruction history registers shared across threads. The sampling logic samples a single instruction at a time, alternating between threads. When a sampled instruction becomes a reporting candidate, the per-thread candidate counter is decremented; if the candidate counter becomes zero, a sample trap pending signal is asserted and the sample is reported via a disrupting trap to the thread from which it was sampled. Sampling for both threads is disabled until software resets the sample trap pending signal.

Sampling may be restarted only after the trap handler has copied the contents of the history registers. Hence, it is desirable for the trap handler to accomplish the copying with minimal delay; until the copying is completed, neither thread can sample instructions (because the history registers could be overwritten prematurely).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
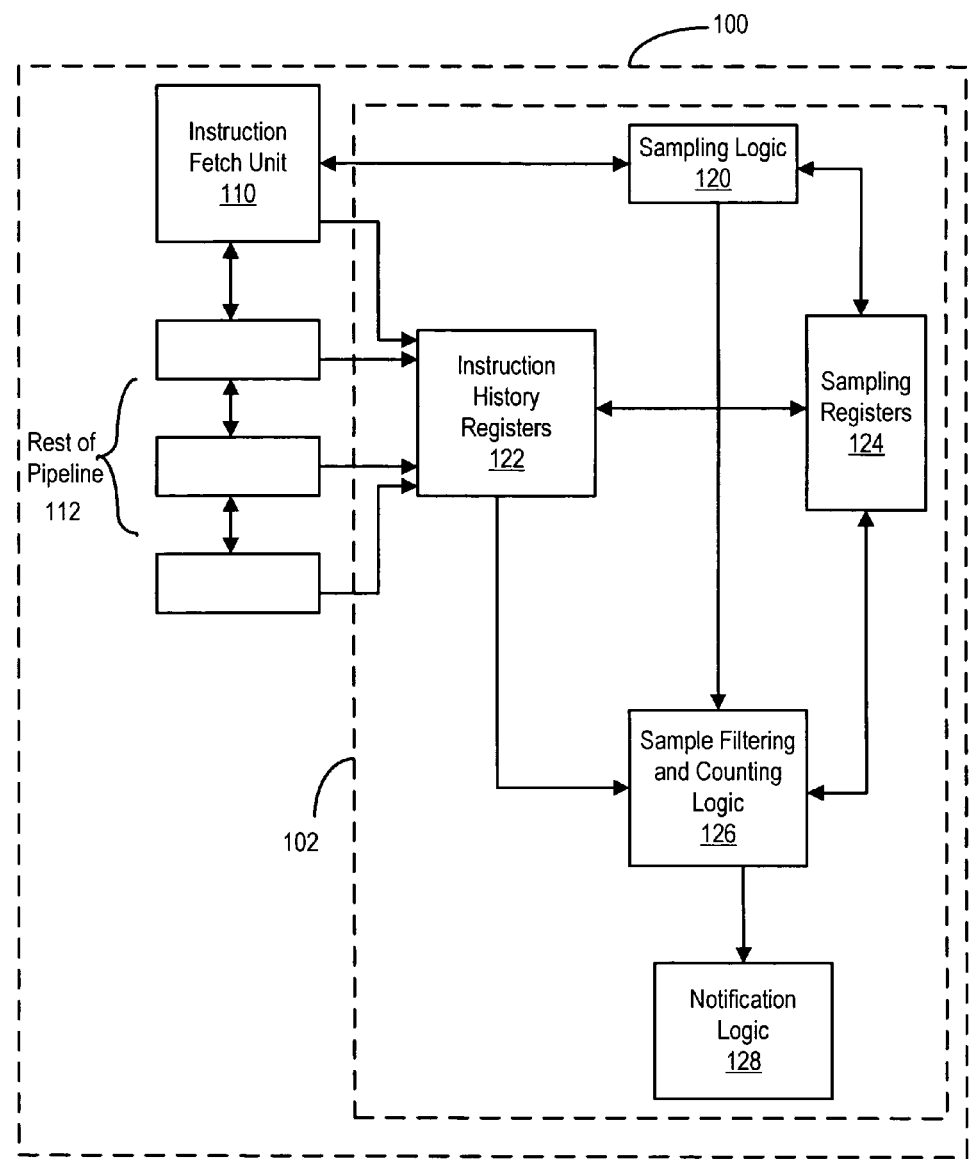
FIG. 1 shows a block diagram of a processor having a sampling mechanism in accordance with the present invention.

Referring to FIG. 1, processor 100 includes sampling mechanism 102. This sampling mechanism 102 is provided to collect detailed information about individual instruction executions. The sampling mechanism 102 is coupled to the instruction fetch unit 110 of the processor 100. The fetch unit 110 is also coupled to the remainder of the processor pipeline 1112. Processor 100 includes additional processor elements as is well known in the art.

The sampling mechanism 102 includes sampling logic 120, instruction history registers 122, sampling registers 124, sample filtering and counting logic 126 and notification logic 128. The sampling logic 120 is coupled to the instruction fetch unit 110, the sampling registers 124 and the sample filtering and counting logic 126. The instruction history registers 122 receive inputs from the instruction fetch unit 110 as well as the remainder of the processor pipeline 112; the instruction history registers 122 are coupled to the sampling registers 124 and the sample filtering and counting logic 126. The sampling registers 124 are also coupled to the sample filtering and counting logic 126. The sample filtering and counting logic 126 are coupled to the notification logic 128.

The sampling mechanism 102 collects detailed information about individual instruction executions. If a sampled instruction meets certain criteria, the instruction becomes a reporting candidate. When the sampling mode is enabled, an instruction is selected randomly by the processor 100 (via, e.g., a linear feedback shift register) as the instructions are fetched. An instruction history is created for the selected instruction. The instruction history is a collection of information including such things as events induced by the sample instruction and various associated latencies. When all events for the sample instruction have been generated (e.g., after the instruction retires or aborts), the vector of events gathered by the instruction history is compared with a user supplied vector, which indicates the events of interest.

In one embodiment, software indicates the properties or events of interest via a bit vector contained in a register. Each bit in this vector corresponds to a property or event which the hardware can gather for an instruction sample. The register can be used as a filter which hardware can apply to an instruction sample to determine if that sample is a candidate for reporting to software. Once these properties or events have been specified, the hardware mechanism that gathers samples compares each sample against the vector of desired properties or events. Hardware can determine a match by combining the software-specified filter with an instruction sample. This combination could be a simple mask operation, or a more expressive operation. Based upon the comparison, the hardware may reject the sample without incurring any software overhead. If the sample matches one or more software-specified properties or events, the sample can be reported to software.

The instruction history including program counter (PC), and privilege status are examples of criteria used in selecting whether an instruction may become a candidate for sampling. If an instruction meets the eligibility test and becomes a candidate, a candidate counter is decremented. If the counter becomes zero, the instruction sample is reported via the notification logic 128. Software copies the instruction's history from the instruction history registers 122 and resets the candidate counter.

Figure 2A:
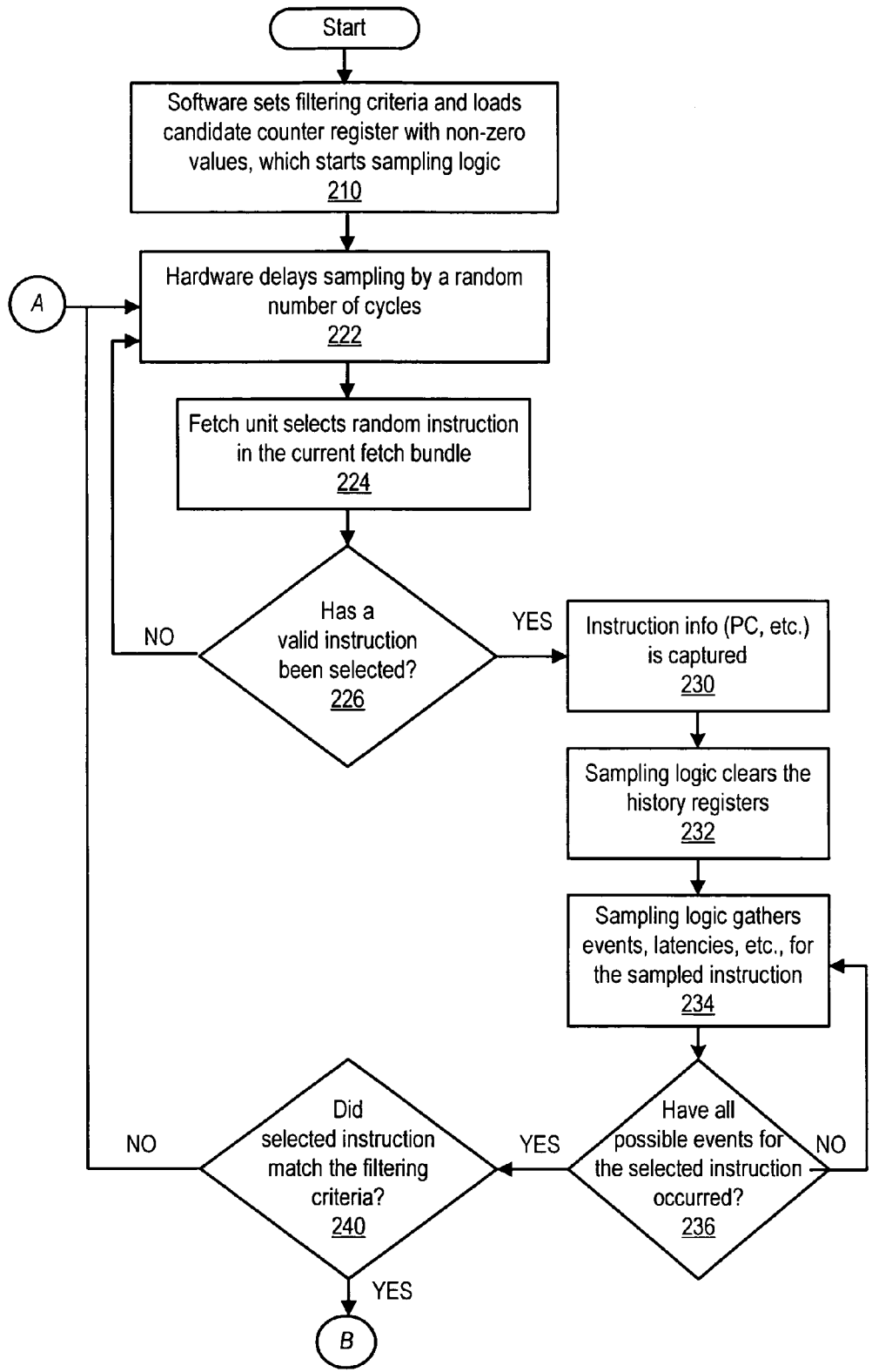
FIGS. 2A and 2B show a flow chart of the operation of the sampling mechanism in accordance with the present invention.
Figure 2B:
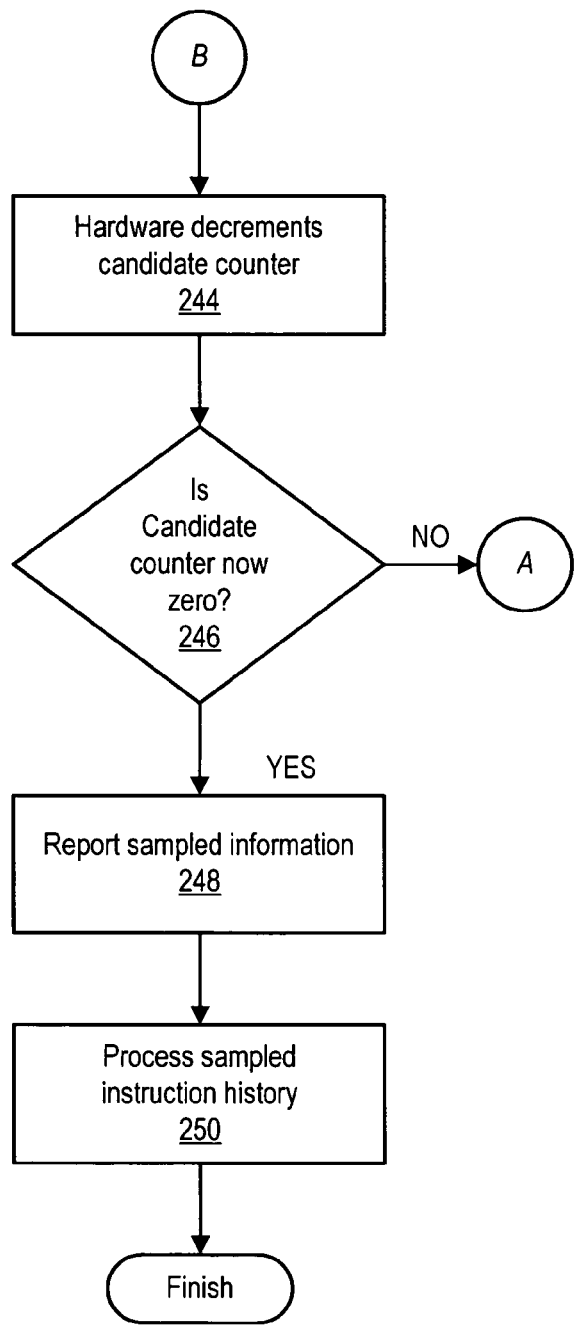

FIGS. 2A and 2B show a flowchart of the operation of sampling mechanism 102. More specifically, at step 210, the software sets filtering criteria and loads a candidate counter register, located within the sample filtering and counting logic 126, with a non-zero value, thus enabling the sampling logic 120. Once the counter register is loaded, the sample filtering and counting logic 126 delays sampling by a random number of cycles at step 222. Next the fetch unit 110 selects a random instruction from a current fetch bundle at step 224. The instruction is analyzed to determine whether a valid instruction has been selected at step 226. If not, then the sampling mechanism 102 returns to step 222.

If the fetched instruction is a valid instruction, then instruction information is captured at step 230. The instruction information includes, for example, the program counter (PC) of the instruction as well as privileged information and context information of the instruction. Next, the sampling logic 120 clears the instruction history registers 122 at step 232. Next, during execution of the instruction by the processor 110, the sampling logic 120 gathers events, latencies, etc. for the sampled instruction at step 234. The sampling logic 120 then reviews the processor state to determine whether all possible events for the selected instruction have occurred at step 236. If not, then the sampling logic 120 continues to gather events etc. at step 234.

If all possible events for the selected instruction have occurred, then the instruction is examined at step 240 to determine whether the selected instruction matches the filtering criteria (i.e., is the selected instruction of interest to the software?). One of the filtering criteria against which the selected instruction is compared is the thread to which the selected instruction is bound. If not, then control returns to step 222 where the counting logic 126 delays the sampling by a random number of cycles to select another instruction for sampling.

If yes, then the counting logic 126 decrements a candidate counter at step 244. Next the candidate counter is analyzed to determine whether the candidate counter is zero at step 246. If the candidate counter is not zero, then control returns to step 222 where the counting logic 126 delays the sampling by a random number of cycles prior to selecting another instruction. If the candidate counter equals zero, then the notification logic 128 reports the sampled instruction at step 248. The candidate counter register value is used to count candidate samples which match the selection criteria. On the transition from 1 to 0 (when made by hardware following a sample) a notification is provided and the instruction history is made available via the instruction history registers. The counter then stays at zero until changed by software. The power-on value of the candidate counter register value is 0. The candidate counter allows software to control how often samples are reported, and thus limits the reporting overhead for instructions which are both interesting and frequent. The software then processes the sampled instruction history at step 250 and the processing of the sampling mechanism 102 finishes.

The sampling mechanism 102 functions in a multithreaded processor. The sampling mechanism 102 is enabled independently for each thread of the processor 100. Each thread of the processor has its own candidate counter and selection criteria registers. However, there is a single set of history registers shared across threads. The sampling logic 120 samples a single instruction at a time, alternating between threads. When a sampled instruction becomes a reporting candidate, the per-thread candidate counter is decremented; if the per-thread candidate counter becomes zero, the sample is reported to the thread from which it was sampled. Sampling is restarted only after the contents of the history registers has been copied and sampling is enabled. Accordingly, it is desirable to accomplish this task with minimal delay; until the copying has been completed, neither thread can have instructions sampled (because the history registers could be overwritten prematurely).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the sampling mechanism 102 is shown coupled to the instruction fetch unit 110, it will be appreciated that the sampling mechanism 102 may be coupled to any location in the processor in which instruction information could be sampled.

Also for example, while certain sample selection criteria values and sample instruction history values have been set forth, it will be appreciated that any combination of these values as well as other values are within the scope of the invention.

Also for example, the above-discussed embodiments include modules that perform certain tasks. The modules discussed herein may include hardware modules or software modules. The hardware modules may be implemented within application specific circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method of sampling instructions executing in a multi-threaded processor comprising:
   selecting an instruction for sampling;
   storing sampling information relating to the instruction;
   determining whether the instruction includes an event of interest to a particular thread within which the instruction is executing; and
   reporting the instruction to the particular thread when the sampling information includes an event of interest.

2. The method of claim 1 further comprising providing a register with a bit vector representing a plurality of events of interest; and
   wherein the determining whether the sampling information includes the event of interest further includes comparing the sampling information relating to the instruction to the bit vector.

3. The method of claim 2 wherein the comparing is via at least one of a mask operation or a more expressive operation.

4. The method of claim 1 wherein the selecting the instruction is without regard to a thread to which the instruction is bound.

5. The method of claim 1 further comprising identifying a thread to which the instruction is bound when the instruction is selected.

6. The method of claim 1 further comprising providing filtering criteria on a per-thread basis.

7. The method of claim 1 further comprising providing a single set of filtering criteria; and, scheduling sampling among a plurality of threads via software.

8. The method of claim 1 wherein storing the sampling information further comprises storing the sampling information to a memory register shared by multiple threads.

9. A method of sampling instructions executing in a multi-threaded processor comprising:
   setting a candidate counter to a number;
   selecting an instruction for sampling;
   storing information relating to the instruction;
   determining whether all events for the instruction have occurred;
   decrementing the candidate counter when all events for the instruction have occurred and when the instruction corresponds to a desired sampled thread;
   determining whether the candidate counter equals zero; and
   reporting the instruction to a particular thread when the candidate counter equals zero.

10. The method of claim 9 wherein the information relating to the instruction represents an instruction history, and the instruction history includes information relating to at least one of an events value, a program counter value, a branch target address value, an effective memory address value, a latency value, a number in issue bundle value, a number in retire bundle value, a privilege value, a branch history value and a number in fetch bundle value.

11. The method of claim 9 wherein the selecting the instruction is without regard to a thread to which the instruction is bound.

12. The method of claim 9 further comprising identifying a thread to which the instruction is bound when the instruction is selected.

13. The method of claim 9 further comprising providing filtering criteria on a per-thread basis.

14. The method of claim 9 further comprising providing a single set of filtering criteria; and, scheduling sampling among a plurality of threads via software.

15. A method of sampling instructions executing in a multi-threaded processor comprising:
   setting a candidate counter to a number;
   selecting an instruction for sampling;
   storing information relating to the instruction;
   determining whether all events for the instruction have occurred;
   determining whether the instruction includes events of interest, the events of interest including whether the instruction corresponds to a desired sampled thread;
   decrementing the candidate counter when all events for the instruction have occurred and when the instruction includes events of interest;
   determining whether the candidate counter equals zero; and
   reporting the instruction to a particular thread when the candidate counter equals zero.

16. The method of claim 15 further comprising providing a register with a bit vector representing events of interest; and wherein the determining whether the instruction includes events of interest further includes comparing the information relating to the instruction to the bit vector.

17. The method of claim 15 wherein the information relating to the instruction represents an instruction history, and the instruction history includes information relating to at least one of an event value, a program counter value, a branch target address value, an effective memory address value, a latency value, a number in issue bundle value, a number in retire bundle value, a privileged value, a branch history value and a number in fetch bundle value.

18. The method of claim 15 wherein the selecting an instruction for sampling is based upon sample selection criteria; and the sample selection criteria include information relating to a desired sampled thread.

19. A multi-threaded processor comprising:
   a sampling logic configured to determine whether an instruction executed in the processor corresponds to a desired sampled thread;
   sampling register logic coupled to the sampling logic;
   an instruction history register logic coupled to the sampling register logic, the instruction history register logic storing information relating to the instruction;
   a sample filtering and counting logic coupled to the sampling logic, wherein the sample filtering and counting logic is replicated on a per thread basis; and a notification logic, the notification logic reporting to a particular thread the information relating to the instruction if the instruction corresponds to the desired sampled thread.

20. The processor of claim 19 wherein the sampling register logic includes a register with a bit vector representing events of interest; and wherein the sampling logic determines whether the instruction includes events of interest by comparing the information relating to the instruction to the bit vector.

21. The processor of claim 19 wherein the information relating to the instruction represents an instruction history, and the instruction history includes information relating to at least one of an events value, a program counter value, a branch target address value, an effective memory address value, a latency value, a number in issue bundle value, a number in retire bundle value, a privileged value, a branch history value and a number in fetch bundle value.

22. The processor of claim 19 wherein the sampling register logic includes a sample selection criteria register storing sample selection criteria; and the sample selection criteria include information relating to a desired sampled thread.

\* \* \* \* \*

UNITED STATES PATENT AND TRADEMARK OFFICE
CERTIFICATE OF CORRECTION

PATENT NO.        : 8,826,241 B2
APPLICATION NO.   : 10/780264
DATED             : September 2, 2014
INVENTOR(S)       : Wolczko et al.

It is certified that error appears in the above-identified patent and that said Letters Patent is hereby corrected as shown below:

In the Specification

Column 2, line 44, delete "1112." and insert -- 112. --, therefor.

Column 3, line 51, delete "110," and insert -- 100, --, therefor.

In the Claims

Column 5, line 30, Claim 1, delete "instruction" and insert -- information --, therefor.

Column 5, line 33, Claim 1, delete "instruction" and insert -- information --, therefor.

Column 6, line 62, Claim 19, delete "sampling" and insert -- a sampling --, therefor.

Signed and Sealed this
Fourteenth Day of July, 2015

Michelle K. Lee
*Director of the United States Patent and Trademark Office*